United States Patent
Wu et al.

(10) Patent No.: US 11,972,169 B2
(45) Date of Patent: Apr. 30, 2024

(54) METHOD, DEVICE AND SYSTEM FOR SHARING SCREEN BY PLURALITY OF DEVICES

(71) Applicant: Samsung Electronics Co., Ltd., Suwon-si (KR)

(72) Inventors: Wenhui Wu, Guangzhou (CN);
Hancheng Wen, Guangzhou (CN);
Xieming Guo, Guangzhou (CN);
Juanjuan Huang, Guangzhou (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/940,611

(22) Filed: Sep. 8, 2022

(65) Prior Publication Data

US 2023/0022056 A1    Jan. 26, 2023

Related U.S. Application Data

(63) Continuation of application No. PCT/KR2022/010684, filed on Jul. 21, 2022.

(30) Foreign Application Priority Data

Jul. 21, 2021   (CN) .......................... 202110825358.8

(51) Int. Cl.
*G06F 3/14*        (2006.01)
(52) U.S. Cl.
CPC .................................. *G06F 3/1454* (2013.01)
(58) Field of Classification Search
CPC .................................................. G06F 3/1454
See application file for complete search history.

(56) References Cited

U.S. PATENT DOCUMENTS 8,347,216 B2    1/2013   Shin et al.
9,614,783 B2    4/2017   Park et al.
(Continued)

FOREIGN PATENT DOCUMENTS

JP    2021-039616 A    3/2021
KR    10-1741398 B1    5/2017
(Continued)

OTHER PUBLICATIONS

International Search Report dated Oct. 28, 2022, issued in International Application No. PCT/KR2022/010684.
(Continued)

*Primary Examiner* — Afroza Chowdhury
(74) *Attorney, Agent, or Firm* — Jefferson IP Law, LLP

(57) ABSTRACT

A processing method for a first device connected with a plurality of external devices in a first communication mode and sharing a screen with the plurality of external devices, includes determining a second device from the plurality of external devices, in response to satisfying a first preset condition, continuing to share the screen with the plurality of external devices in a second communication mode, and sending screen data or data associated with a screen display content to the second device in the first communication mode, to cause the second device to replace the first device to continue to share the screen with another external device other than the second device in the plurality of external devices, and disconnecting a connection with the plurality of external devices in the second communication mode, in response to the second device successfully continuing to share the screen with the other external device.

17 Claims, 9 Drawing Sheets

(56) References Cited

U.S. PATENT DOCUMENTS

| | | | |
|---|---|---|---|
| 10,042,596 B2 | 8/2018 | Jung et al. | |
| 10,757,185 B2 | 8/2020 | Han et al. | |
| 11,190,915 B2 | 11/2021 | Han et al. | |
| 2012/0280898 A1 | 11/2012 | Lucero et al. | |
| 2013/0254291 A1* | 9/2013 | Park | H04N 21/4122 |
| | | | 709/204 |
| 2015/0365468 A1 | 12/2015 | Khan et al. | |
| 2016/0283181 A1 | 9/2016 | Jung et al. | |
| 2017/0280308 A1* | 9/2017 | Charters | H04W 84/18 |
| 2019/0196774 A1 | 6/2019 | Sarfi et al. | |
| 2021/0351946 A1* | 11/2021 | Chanda | H04L 12/1818 |
| 2022/0318038 A1 | 10/2022 | Luo | |
| 2022/0365606 A1* | 11/2022 | Hinckley | G06F 1/1684 |

FOREIGN PATENT DOCUMENTS

| | | |
|---|---|---|
| KR | 10-1740667 B1 | 6/2017 |
| KR | 10-2017-0081486 A | 7/2017 |
| KR | 10-2017-0096394 A | 8/2017 |
| KR | 10-2012049 B1 | 8/2019 |
| KR | 10-2144339 B1 | 8/2020 |

OTHER PUBLICATIONS

Written Opinion dated Oct. 28, 2022, issued in International Application No. PCT/KR2022/010684.

* cited by examiner

METHOD, DEVICE AND SYSTEM FOR SHARING SCREEN BY PLURALITY OF DEVICES

CROSS-REFERENCE TO RELATED APPLICATION(S)

This application is a continuation application, claiming priority under § 365(c), of an International application No. PCT/KR2022/010684, filed on Jul. 21, 2022, which is based on and claims the benefit of a Chinese patent application number 202110825358.8, filed on Jul. 21, 2021, in the Chinese National Intellectual Property Administration, the disclosure of which is incorporated by reference herein in its entirety.

BACKGROUND

1. Field

The disclosure relates to the field of computer technology. More particularly, the disclosure relates to a method, device and system for sharing a screen by a plurality of devices.

2. Description of the Prior Art

According to the single-device or multi-device screen projection technology (which may also be referred to as a screen sharing technology), the screen content of a master device or a part of the screen content is shared with one or more other devices in a short-range wireless communication mode (e.g., a Wi-Fi direct connection), such that the master device and the one or more other devices display the same content synchronously. For example, in a conference scenario, a presenter may share his own Power Point Presentation (PPT) across the portable terminals of participants for display. However, when a single-device screen projection or a multi-device screen projection is performed for a long period of time, due to a long-term connection between the devices in the short-range wireless communication mode, the devices consume power quickly, especially the master device. In the Wi-Fi direct connection, the master device may be referred to as an Owner device, which refers to a device initiating a connection in a Wi-Fi direct connection network and which is responsible for forwarding screen projection data to each connected device (which may be referred to as a Client device). When the power of the master device (e.g., the Owner device) is low, a user needs to switch to another device as soon as possible, to use the device as a new master device to continue a screen projection.

The above information is presented as background information only to assist with an understanding of the disclosure. No determination has been made, and no assertion is made, as to whether any of the above might be applicable as prior art with regard to the disclosure.

SUMMARY

However, it is troublesome to reorganize a network or transmit a projected file to a new device, which disadvantageously affects the user experience.

Aspects of the disclosure are to address at least the above-mentioned problems and/or disadvantages and to provide at least the advantages described below. Accordingly, an aspect of the disclosure is to provide a method, device and system for sharing a screen by a plurality of devices to at least solve the above problems in the related art, which however may not solve any of the above problems.

Additional aspects will be set forth in part in the description which follows and, in part, will be apparent from the description, or may be learned by practice of the presented embodiments.

In accordance with an aspect of the disclosure, a processing method for a first device is provided. The first device being connected with a plurality of external devices in a first communication mode and sharing a screen with the plurality of external devices. The processing method includes determining a second device from the plurality of external devices, in response to satisfying a first preset condition, continuing to share the screen with the plurality of external devices in a second communication mode, and sending screen data or data associated with a screen display content to the second device in the first communication mode, to cause the second device to replace the first device to continue to share the screen with another external device other than the second device in the plurality of external devices, and disconnecting a connection with the plurality of external devices in the second communication mode, in response to the second device successfully continuing to share the screen with the other external device. The first communication mode is different from the second communication mode.

Sending the screen data to the second device in the first communication mode may include sending the screen data to the second device in real time in the first communication mode, to cause the second device to forward the screen data received from the first device to the other external device in real time.

The data associated with the screen display content may include a shared screen file in use and a presentation progress of the file. The method may further include disconnecting a connection with the second device in the first communication mode, in response to the second device successfully continuing to share the screen with the other external device.

The data associated with the screen display content further includes at least one of a software installation package performing screen sharing and a subsequently usable shared screen file.

The first preset condition may be a current remaining charge of the first device being lower than a predetermined threshold The method in a first mode may be performed, in response to the current remaining charge of the first device being lower than a first predetermined threshold but not lower than a second predetermined threshold, and the method in a second mode may be performed, in response to the current remaining charge of the first device being lower than the second predetermined threshold. The first predetermined threshold is greater than the second predetermined threshold.

The determining a second device from the plurality of external devices may include acquiring status information of the plurality of external devices, and determining, based on the acquired status information, the second device from the plurality of external devices according to a first rule.

The status information may include at least one of a current remaining charge, a current central processing unit (CPU) capability and information on whether being charged. The first rule may include selecting an optimal device from the plurality of external devices based on one or more of the current remaining charge, the current CPU capability and the information on whether being charged.

The determining a second device from the plurality of external devices may include providing at least one device satisfying a second preset condition in the plurality of external devices for selection, and determining, in response to a selection of a user from the at least one device, a device selected by the user as the second device.

The method may further include acquiring at least one of a current screen content and an operating situation of a current user for the screen content, in response to satisfying the first preset condition, and determining a switching opportunity based on at least one of the acquired current screen content and the acquired operating situation of the current user for the screen content. The continuing to share the screen with the plurality of external devices in a second communication mode may include beginning to perform the continuing to share the screen with the plurality of external devices in a second communication mode, when the determined switching opportunity is reached.

The second device may replace the first device to continue to share the screen with the other external device in the first communication mode. The method may further include sending, after determining the second device, an identifier (ID) of the second device to the other external device in the first communication mode, and sending an ID of the other external device to the second device. The second device performs a connection with the other external device in the first communication mode, based on the ID of the other external device.

The continuing to share the screen with the plurality of external devices in a second communication mode includes establishing the connection with the plurality of external devices in the second communication mode, and sending, after establishing the connection, the screen data to the plurality of external devices in real time in the second communication mode, to continue to share the screen.

The disconnecting of the connection with the plurality of external devices in the second communication mode may include disconnecting the connection with the plurality of external devices in the second communication mode, in response to receiving an instruction to disconnect the connection in the second communication mode from the second device. Here, after successfully continuing to share the screen with the other external device, the second device sends the instruction to the first device and the other external device.

The first communication mode and the second communication mode may both be short-range wireless communication modes.

The first communication mode may be a Wi-Fi direct communication, and the second communication mode may be a Bluetooth communication.

In accordance with another aspect of the disclosure, a processing method for a second device is provided. A first device is connected with a plurality of external devices in a first communication mode, the plurality of external devices accept a screen shared by the first device in the first communication mode, and the second device is a device determined from the plurality of external devices by the first device and replacing the first device to perform screen sharing. The processing method includes continuing to accept the screen shared by the first device in a second communication mode in response to the first device satisfying a first preset condition, and receiving screen data or data associated with a screen display content from the first device in the first communication mode, replacing the first device to continue to share the screen with another external device other than the second device in the plurality of external devices, based on the received screen data or the received data associated with the screen display content, and disconnecting a connection with the first device in the second communication mode, in response to the second device successfully continuing to share the screen with the other external device.

Alternatively, receiving the screen data from the first device in the first communication mode includes receiving the screen data from the first device in real time in the first communication mode. Here, replacing the first device to continue to share the screen with the other external device based on the received screen data includes forwarding the screen data received from the first device to the other external device in real time.

Alternatively, the data associated with the screen display content includes a shared screen file in use and a presentation progress of the file. Here, replacing the first device to continue to share the screen with the other external device based on the data associated with the screen display content includes acquiring the screen data based on the file and the presentation progress of the file, and sharing the screen with the other external device based on the acquired screen data. Here, the method further includes disconnecting a connection with the first device in the first communication mode, after replacing the first device to continue to share the screen with the other external device.

Alternatively, the data associated with the screen display content further includes at least one of a software installation package performing screen sharing and a subsequently usable shared screen file. Here, replacing the first device to continue to share the screen with the other external device based on the data associated with the screen display content includes at least one of: installing software performing screen sharing based on the software installation package performing the screen sharing, and sharing subsequently the screen with the other external device based on the subsequently usable shared screen file.

Alternatively, the first preset condition may be a current remaining charge of the first device being lower than a predetermined threshold.

Alternatively, the method in a first mode may be performed, in response to the current remaining charge of the first device being lower than a first predetermined threshold but not lower than a second predetermined threshold, and the method in a second mode may be performed, in response to the current remaining charge of the first device being lower than the second predetermined threshold. Here, the first predetermined threshold is greater than the second predetermined threshold.

Alternatively, the method further includes sending, before the continuing to accept the screen shared by the first device in a second communication mode, status information of the second device to the first device, to cause the first device to determine, based on the status information of the second device and status information of the other external device, the second device from the plurality of external devices as the device replacing the first device to perform the screen sharing, according to a first rule.

Alternatively, the status information includes at least one of a current remaining charge, a current CPU capability and information on whether being charged. Here, the first rule includes selecting an optimal device from the plurality of external devices based on one or more of the current remaining charge, the current CPU capability and the information on whether being charged.

Alternatively, the second device may be a device selected by a user from at least one device satisfying a second preset condition in the plurality of external devices.

Alternatively, the continuing to accept the screen shared by the first device in a second communication mode includes beginning to perform the continuing to accept the screen shared by the first device in a second communication mode, when a switching opportunity determined by the first device is reached. Here, the first device determines the switching opportunity based on at least one of a current screen content and an operating situation of a current user for the screen content.

Alternatively, the method further includes receiving an ID of the other external device from the first device, after the first device determines the second device. Here, replacing the first device to continue to share the screen with the other external device includes performing a connection with the other external device in the first communication mode based on the ID of the other external device, and replacing the first device to continue to share the screen with the other external device in the first communication mode.

Alternatively, the continuing to accept the screen shared by the first device in a second communication mode includes establishing the connection with the first device in the second communication mode, and receiving, after establishing the connection, the screen data from the first device in real time in the second communication mode, to continue to accept the shared screen.

Alternatively, the disconnecting a connection with the first device in the second communication mode includes sending an instruction to disconnect the connection in the second communication mode to the first device and the other external device, and disconnecting the connection with the first device in the second communication mode, in response to the first device disconnecting a connection with the plurality of external devices in the second communication mode based on the instruction.

Alternatively, the first communication mode and the second communication mode may both be short-range wireless communication modes.

Alternatively, the first communication mode may be a Wi-Fi direct communication, and the second communication mode may be a Bluetooth communication.

In accordance with another aspect of the disclosure, a first device is provided. The first device may be connected with a plurality of external devices in a first communication mode and sharing a screen with the plurality of external devices. The first device includes a device determining unit, configured to determine a second device from the plurality of external devices, in response to satisfying a first preset condition, a screen sharing unit, configured to continue to share the screen with the plurality of external devices in a second communication mode, and send screen data or data associated with a screen display content to the second device in the first communication mode, to cause the second device to replace the first device to continue to share the screen with another external device other than the second device in the plurality of external devices, and a communication connecting unit, configured to disconnect a connection with the plurality of external devices in the second communication mode, in response to the second device successfully continuing to share the screen with the other external device. Here, the first communication mode is different from the second communication mode.

Alternatively, the screen sharing unit may be configured to send the screen data to the second device in real time in the first communication mode, to cause the second device to forward the screen data received from the first device to the other external device in real time.

Alternatively, the data associated with the screen display content includes a shared screen file in use and a presentation progress of the file. Here, the communication connecting unit may be configured to disconnect a connection with the second device in the first communication mode, in response to the second device successfully continuing to share the screen with the other external device.

Alternatively, the data associated with the screen display content further includes at least one of a software installation package performing screen sharing and a subsequently usable shared screen file.

Alternatively, the first preset condition may be a current remaining charge of the first device being lower than a predetermined threshold Alternatively, the screen sharing unit may perform an operation in a first mode, in response to the current remaining charge of the first device being lower than a first predetermined threshold but not lower than a second predetermined threshold, and the screen sharing unit and the communication connecting unit may perform an operation in a second mode, in response to the current remaining charge of the first device being lower than the second predetermined threshold. Here, the first predetermined threshold is greater than the second predetermined threshold.

Alternatively, the device determining unit may be configured to acquire status information of the plurality of external devices, and determine, based on the acquired status information, the second device from the plurality of external devices according to a first rule.

Alternatively, the status information includes at least one of a current remaining charge, a current CPU capability and information on whether being charged. Here, the first rule includes selecting an optimal device from the plurality of external devices based on one or more of the current remaining charge, the current CPU capability and the information on whether being charged.

Alternatively, the device determining unit may be configured to provide at least one device satisfying a second preset condition in the plurality of external devices for selection, and determine, in response to a selection of a user from the at least one device, a device selected by the user as the second device.

Alternatively, the first device further includes an opportunity determining unit, configured to acquire at least one of a current screen content and an operating situation of a current user for the screen content, in response to satisfying the first preset condition, and determine a switching opportunity based on at least one of the acquired current screen content and the acquired operating situation of the current user for the screen content. Here, the screen sharing unit may be configured to begin to continue to share the screen with the plurality of external devices in the second communication mode, when the determined switching opportunity is reached.

Alternatively, the second device may replace the first device to continue to share the screen with the other external device in the first communication mode. Here, the first device further includes a sending unit, configured to send, after the second device is determined, an ID of the second device to the other external device in the first communication mode, and send an ID of the other external device to the second device. Here, the second device performs a connection with the other external device in the first communication mode, based on the ID of the other external device.

Alternatively, the screen sharing unit may be configured to: establish the connection with the plurality of external devices in the second communication mode, and send, after establishing the connection, the screen data to the plurality of external devices in real time in the second communication mode, to continue to share the screen.

Alternatively, the communication connecting unit may be configured to disconnect the connection with the plurality of external devices in the second communication mode, in response to receiving an instruction to disconnect the connection in the second communication mode from the second device. Here, after successfully continuing to share the screen with the other external device, the second device sends the instruction to the first device and the other external device.

Alternatively, the first communication mode and the second communication mode may both be short-range wireless communication modes.

Alternatively, the first communication mode may be a Wi-Fi direct communication, and the second communication mode may be a Bluetooth communication.

In accordance with another aspect of the disclosure, a second device is provided. A first device is connected with a plurality of external devices in a first communication mode, the plurality of external devices accept a screen shared by the first device in the first communication mode, and the second device is a device determined from the plurality of external devices by the first device and replacing the first device to perform screen sharing. The second device includes a screen sharing unit, configured to continue to accept the screen shared by the first device in a second communication mode in response to the first device satisfying a first preset condition, receive screen data or data associated with a screen display content from the first device in the first communication mode, and replace the first device to continue to share the screen with another external device other than the second device in the plurality of external devices, based on the received screen data or the received data associated with the screen display content, and a communication connecting unit, configured to disconnect a connection with the first device in the second communication mode, in response to the second device successfully continuing to share the screen with the other external device.

Alternatively, the screen sharing unit may be configured to receive the screen data from the first device in real time in the first communication mode, and forward the screen data received from the first device to the other external device in real time.

Alternatively, the data associated with the screen display content includes a shared screen file in use and a presentation progress of the file. Here, the screen sharing unit may be configured to acquire the screen data based on the file and the presentation progress of the file, and share the screen with the other external device based on the acquired screen data. Here, the communication connecting unit may be configured to disconnect a connection with the first device in the first communication mode, after the first device is replaced to continue to share the screen with the other external device.

Alternatively, the data associated with the screen display content further includes at least one of a software installation package performing screen sharing and a subsequently usable shared screen file. Here, the screen sharing unit may be configured to perform at least one of installing software performing screen sharing based on the software installation package performing the screen sharing, and sharing subsequently the screen with the other external device based on the subsequently usable shared screen file.

Alternatively, the first preset condition may be a current remaining charge of the first device being lower than a predetermined threshold.

Alternatively, the screen sharing unit may perform an operation in a first mode, in response to the current remaining charge of the first device being lower than a first predetermined threshold but not lower than a second predetermined threshold, and the screen sharing unit and the communication connecting unit may perform an operation in a second mode, in response to the current remaining charge of the first device being lower than the second predetermined threshold. Here, the first predetermined threshold is greater than the second predetermined threshold.

Alternatively, the second device further includes a sending unit, configured to send, before the accepting of the screen shared by the first device is continued in the second communication mode, status information of the second device to the first device, to cause the first device to determine, based on the status information of the second device and status information of the other external device, the second device from the plurality of external devices as the device replacing the first device to perform the screen sharing, according to a first rule.

Alternatively, the status information includes at least one of a current remaining charge, a current CPU capability and information on whether being charged. Here, the first rule includes selecting an optimal device from the plurality of external devices based on one or more of the current remaining charge, the current CPU capability and the information on whether being charged.

Alternatively, the second device may be a device selected by a user from at least one device satisfying a second preset condition in the plurality of external devices.

Alternatively, the screen sharing unit may be configured to begin to continue to accept the screen shared by the first device in the second communication mode, when a switching opportunity determined by the first device is reached. Here, the first device determines the switching opportunity based on at least one of a current screen content and an operating situation of a current user for the screen content.

Alternatively, the second device further includes a receiving unit, configured to receive an ID of the other external device from the first device, after the first device determines the second device. Here, the screen sharing unit may be configured to perform a connection with the other external device in the first communication mode through the communication connecting unit based on the ID of the other external device, and replace the first device to continue to share the screen with the other external device in the first communication mode.

Alternatively, the screen sharing unit may be configured to establish the connection with the first device in the second communication mode, and receive, after establishing the connection, the screen data from the first device in real time in the second communication mode, to continue to accept the shared screen.

Alternatively, the second device further includes the sending unit, configured to send an instruction to disconnect the connection in the second communication mode to the first device and the other external device. Here, the communication connecting unit may be configured to disconnect the connection with the first device in the second communication mode, in response to the first device disconnecting a connection with the plurality of external devices in the second communication mode based on the instruction.

Alternatively, the first communication mode and the second communication mode may both be short-range wireless communication modes.

Alternatively, the first communication mode may be a Wi-Fi direct communication, and the second communication mode may be a Bluetooth communication.

In accordance with another aspect of the disclosure, a system for sharing a screen by a plurality of devices is provided. The system includes a first device and a plurality of external devices. The first device is connected with the plurality of external devices in a first communication mode, and shares a screen with the plurality of external devices. In response to satisfying a first preset condition, the first device determines a second device from the plurality of external devices. The first device continues to share the screen with the plurality of external devices in a second communication mode, and sends screen data or data associated with a screen display content to the second device in the first communication mode. The second device replaces the first device to continue to share the screen with another external device other than the second device in the plurality of external devices in the first communication mode, based on the received screen data or the received data associated with the screen display content. In response to the second device successfully continuing to share the screen with the other external device, the first device disconnects a connection with the plurality of external devices in the second communication mode. Here, the first communication mode is different from the second communication mode.

In accordance with another aspect of the disclosure, an electronic device is provided. The electronic device includes at least one processor, and at least one storage device storing a computer executable instruction. The computer executable instruction, when being executed by the at least one processor, causes the at least one processor to perform the processing method for the first device or the processing method for the second device according to the disclosure.

In accordance with an aspect of the disclosure, a computer readable storage medium is provided. An instruction in the computer readable storage medium, when being executed by at least one processor, causes the at least one processor to perform the processing method for the first device or the processing method for the second device according to the disclosure.

Advantageous Effects

The technical solution provided by the embodiments of the disclosure at least have the following beneficial effects.

According to the method, device and system for sharing a screen by a plurality of devices in the disclosure, when the power consumption of a master device sharing a content with another device is serious (e.g., the remaining charge is lower than a threshold), the master device is insensibly switched to another device that is accepting a projected screen (e.g., a screened device with a sufficient power consumption capability) through a relay of different wireless protocols (e.g., Wi-Fi and Bluetooth), to ensure that the screen projection is continued without disconnecting and reorganizing a network, thereby improving the user experience.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
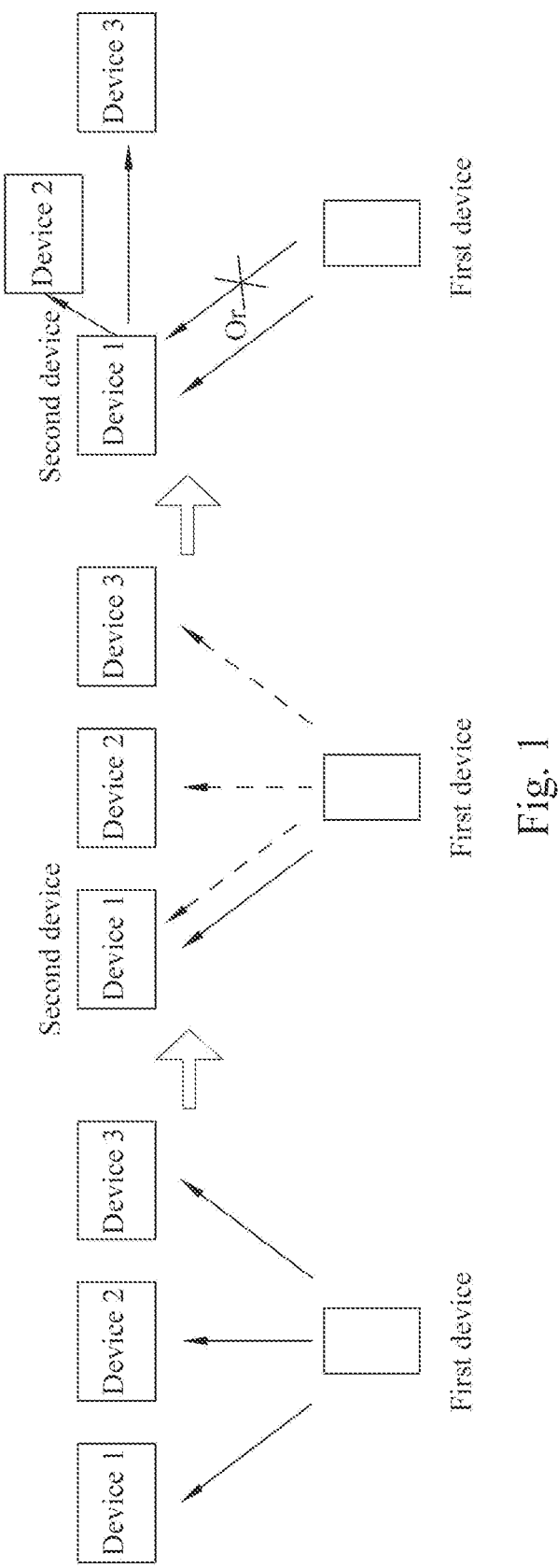
FIG. 1 is a schematic diagram illustrating a method for sharing a screen by a plurality of devices according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be noted that the terms "first," "second" and the like in the specification and claims of the disclosure and in the accompanying drawings are used to distinguish similar objects, and not necessarily used to describe a specific order or an order of priority. It should be understood that the data used in this way may be interchanged in an appropriate situation, such that the embodiments of the disclosure that are described herein can be implemented in an order other than that illustrated or described herein. The implementations described in the following embodiments do not represent all embodiments consistent with the disclosure. Rather, the implementations are merely examples of the apparatus and method consistent with some aspects of the disclosure and described in detail in the appended claims.

It should be noted here that "at least one of several items" in the disclosure represents that the three parallel situations "any one of the several items," "any combination of two or more of the several items" and "all of the several items" are contained. As an example, "including at least one of A and B" includes the following three parallel situations: 1) including A; 2) including B; and 3) including A and B. As another example, "performing at least one of step 1 and step 2" represents the following three parallel situations: 1) performing step 1; 2) performing step 2; and 3) performing step 1 and step 2.

An actual test is performed for the screen projection of a device. Two devices of the same model number are fully charged (i.e., an electric charge of 100%). In the test, the screen of the Owner device is projected onto one Client device for a duration of one hour. After the screen is projected, the same video is played repetitively. The Owner device consumes 20% of power and the Client device consumes 8% of power. It can be seen that the Owner device is prone to low power during the screen projection of the device. As a result, when the power of the Owner device is low, a user needs to switch to another device (e.g., one of the Client devices) as the Owner as soon as possible, to continue the screen projection. However, it is troublesome to reorganize a network or transmit a projected file to a new device, which affects the user experience.

In order to solve the above problems and avoid a situation where excessive power consumption is caused due to the screen projection, the disclosure provides a method, device and system for sharing a screen by a plurality of devices. When the power consumption of a master device sharing content with another device is serious (e.g., the electric charge is lower than a threshold), the master device is switched to another device that is accepting a projected screen (e.g., a screened device with a sufficient power consumption capability) through a relay of different wireless protocols (e.g., Wi-Fi and Bluetooth), to ensure that the screen projection is continued without disconnecting and reorganizing a network, thereby improving the user experience. For example, in a process in which the Wi-Fi directly connected master device is switched to the other device that is accepting the projected screen to use the other device as a new master device, a Bluetooth connection may be first used to maintain a data transmission at a slow speed, the Wi-Fi connection is then disconnected and reorganized, and the Bluetooth connection is disconnected after the Wi-Fi connection is reconnected. Hereinafter, the method, device and system for sharing a screen by a plurality of devices according to the disclosure will be specifically described with reference to FIGS. 1 to 12.

FIG. 1 is a schematic diagram illustrating a method for sharing a screen by a plurality of devices according to an embodiment of the disclosure.

Referring to FIG. 1, a first device may be connected with a plurality of external devices (e.g., but not limited to, a device 1, a device 2, and a device 3) in a first communication mode (as shown by solid lines), and share a screen with the plurality of external devices. When the power consumption of the first device is serious (e.g., the remaining power is lower than a threshold), a connection with the plurality of external devices in a second communication mode may be initiated (as shown by dashed lines), the sharing of the screen with the plurality of external devices may be continued in the second communication mode, and screen data or related data of the shared screen may be sent to a second device (e.g., the device 1 is screened from the device 1, the device 2 and the device 3 as the second device) in the first communication mode. The first device may disconnect the connection with the plurality of external devices in the first communication mode.

The second device may initiate a connection with the first device and a device other than the second device in the plurality of external devices in the first communication mode, and replace the first device to continue to share the screen with another external device other than the second device in the plurality of external devices based on the received screen data or the received related data of the shared screen. When the second device successfully continues to share the screen, the first device may disconnect the connection with the plurality of external devices in the second communication mode, and may selectively disconnect the connection with the second device in the first communication mode. According to the above, the screen shared by the first device may be insensibly switched, for the second device to continue to share the screen. Here, the first communication mode and the second communication mode are different communication modes, and may be short-range wireless communication modes. For example, but not limited to, the first communication mode is a Wi-Fi direct communication, and the second communication mode is a Bluetooth communication.

Figure 2:
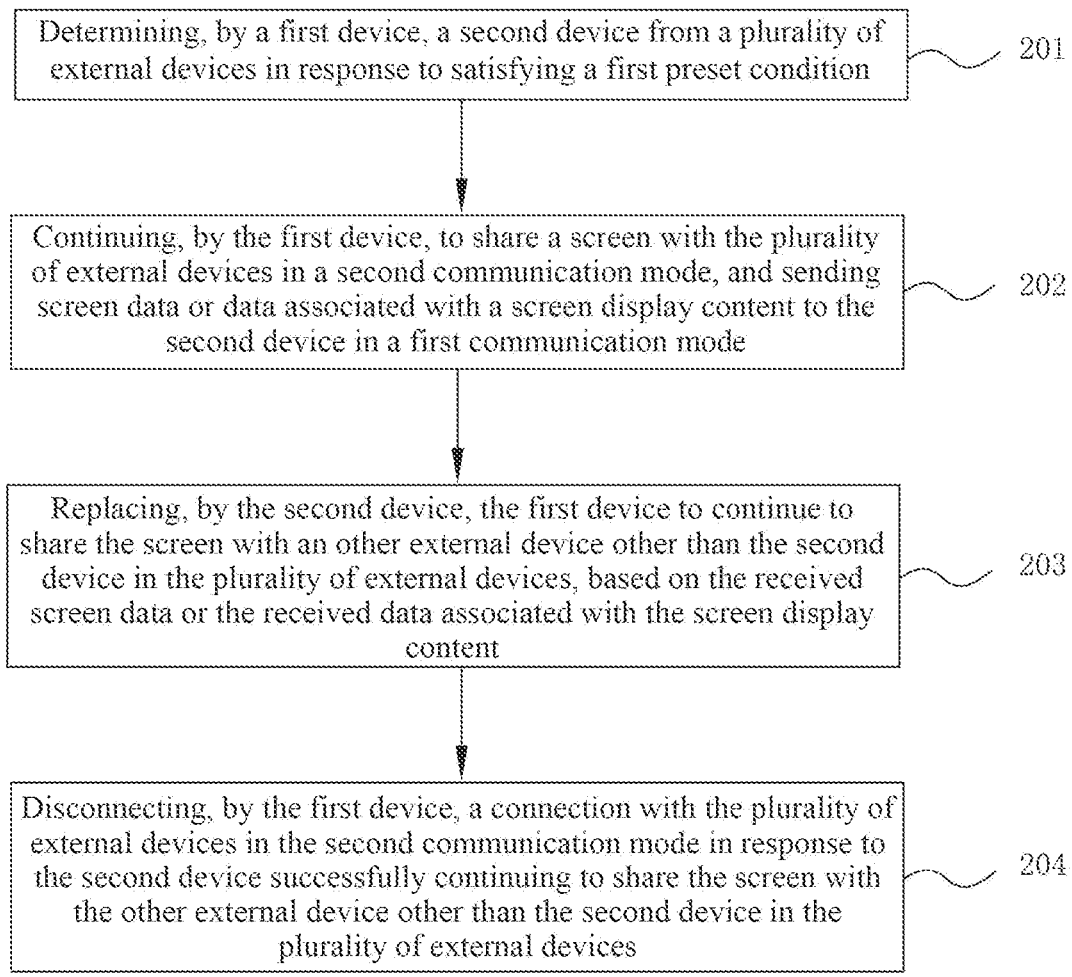
FIG. 2 is a flowchart illustrating a method for sharing a screen by a plurality of devices according to an embodiment of the disclosure.

FIG. 2 is a flowchart illustrating a method for sharing a screen by a plurality of devices according to an embodiment of the disclosure. The connection between a plurality of devices may be shown with reference to FIG. 1. Clearly, the connection between the plurality of devices that is shown in FIG. 1 is merely an example.

Referring to FIG. 2, the method for sharing a screen by a plurality of devices according to the disclosure is applicable to any possible scenario where a plurality of devices share a screen. As shown in FIG. 1, a plurality of devices may include the first device and a plurality of external devices (e.g., the device 1, the device 2 and the device 3). Here, the first device, as a master device, is connected with the plurality of external devices in a first communication mode (e.g., but not limited to, a Wi-Fi direct connection), and shares a screen with the plurality of external devices. That is, the plurality of external devices accept the screen shared by the first device in the first communication mode.

Referring to FIG. 2, in operation 201, a first device determines a second device from a plurality of external devices, in response to satisfying a first preset condition. It is assumed that the device 1 in the plurality of external devices is determined as the second device.

According to an embodiment of the disclosure, the first preset condition may be that a current remaining charge of the first device is lower than a predetermined threshold. When it is detected that the remaining power of the first device is lower than the predetermined threshold, a function of switching the master device may be started.

According to an embodiment of the disclosure, the first device may acquire status information of the plurality of external devices (i.e., the plurality of external devices (e.g., the second device) send respective status information to the first device), and determine, based on the acquired status information, the second device from the plurality of external devices according to a first rule. The first device determines the second device as a new master device after the switching. For example, the status information may include at least one of a current remaining charge, a current CPU capability, and information on whether being charged. The first rule may include: selecting an optimal device from the plurality of external devices based on one or more of the current remaining charge, the current CPU capability, and the information on whether being charged. The method of determining (or selecting) the second device may include, but is not limited to, Method 1: selecting a device having a highest current remaining charge in the plurality of external devices; Method 2: selecting a device having a best current remaining charge and a best current CPU capability in the plurality of external devices; and Method 3: selecting a device that is currently being charged in the plurality of external devices.

Alternatively, the second device may be determined through a superposition of the above methods. A device having a best status may be determined by comprehensively considering each piece of status information. For example, each kind of status information may be assigned a weight value, and weight values of various kinds of status information of each external device in the plurality of external devices are added, to obtain an integrated status value of each external device. A device having a best integrated status value is selected.

According to an embodiment of the disclosure, the first device may determine the second device by receiving information of specifying the second device from a user. For example, when satisfying the first preset condition, the first device may pop up an option to provide a candidate device range, for the user to manually select the second device from the candidate device range. As an example, the first device may provide the plurality of external devices for the user to select. As another example, according to the status information of the plurality of external devices, the first device may select a plurality of devices having an excellent status as candidate devices for the user to select. For example, the first device may provide at least one device satisfying a second preset condition in the plurality of external devices for selection; and determine, in response to a selection of the user from the at least one device, a device selected by the user as the second device. The second preset condition may be that a status of a device reaches a certain threshold range. For example, the second preset condition may include: the current remaining power of the device being greater than or equal to 70%; the current remaining power of the device being greater than or equal to 70% and the current CPU occupation rate of the device being less than or equal to 50%; the device that is being charged; or the like.

The way in which the first device determines the second device from the plurality of external devices is not limited to the above embodiments. The second device may also be determined in any possible way, for example, the second device may be a pre-specified device or the like.

In operation 202, the first device continues to share a screen with the plurality of external devices in a second communication mode (e.g., but not limited to, Bluetooth), and sends screen data or data associated with a screen display content to the second device in a first communication mode. The first communication mode is different from the second communication mode. In response to the first device satisfying the first preset condition, the plurality of external devices continue to accept the screen shared by the first device in the second communication mode, and the second device receives the screen data or the data associated with the screen display content from the first device in the first communication mode.

In operation 203, the second device replaces the first device to continue to share the screen with another external device other than the second device in the plurality of external devices, based on the received screen data or the received data associated with the screen display content. In operation 204, in response to the second device successfully continuing to share the screen with the other external device other than the second device in the plurality of external devices, the first device disconnects a connection with the plurality of external devices in the second communication mode. In response to the second device successfully continuing to share the screen with the other external device other than the second device in the plurality of external devices, the plurality of external devices (e.g., the second device) may disconnect the connection with the first device in the second communication mode.

According to an embodiment of the disclosure, in response to satisfying the first condition, the first device may further acquire at least one of a current screen content and an operating situation of a current user for the screen content, and determine a switching opportunity based on at least one of the acquired current screen content and the acquired operating situation of the current user for the screen content. Accordingly, when the determined switching opportunity is reached, the first device begins to continue to share the screen with the plurality of external devices in the second communication mode. For example, the first device determines the switching opportunity according to whether the current screen content changes and/or a frequency at which the user operates on a projected screen. The method in which the first device determines the switching opportunity may include, but is not limited to, Method 1: selecting time at which a screen of a screen projection interface remains stable and unchanged within a certain time; Method 2: selecting time at which no user operation is received within a certain time; and Method 3: prejudging no user operation within a certain subsequent time according to an App interface on a current projected screen. For example, the current projected screen is the content of a certain page of a PPT, and the content of the next page of the PPT is a static image, and thus, the moment at which the user switches the screen to the next page is the best switching time. In addition, the first device may also determine the best switching opportunity by comprehensively considering the above methods.

The method in which the first device determines the switching opportunity is not limited to the above methods. The switching opportunity may also be determined in other possible ways. For example, the switching opportunity may be triggered manually by the user to start the switching.

According to an embodiment of the disclosure, after determining the second device, the first device may send a notification concerning that the second device replaces the first device to perform the sharing of the screen to the plurality of external devices, to notify the plurality of external devices that the second device is selected as the new master device sharing the screen. For example, the first device may send the ID of the second device to the other external device, and send the ID of the other external device to the second device to notify the second device that the second device needs to share the screen with which devices. Accordingly, the second device receives the ID of the other external device from the first device. As a result, the second device performs the connection with the other external device in the first communication mode based on the ID of the other external device, and replaces the first device to continue to share the screen with the other external device in the first communication mode. In addition, after determining the switching opportunity, the first device may notify the plurality of external devices of the switching opportunity.

According to an embodiment of the disclosure, after successfully continuing to share the screen with the other external device, the second device sends an instruction to disconnect the connection in the second communication mode to the first device and the other external device. In response to receiving the instruction, the first device disconnects the connection with the plurality of external devices in the second communication mode. As a result, the plurality of external devices (e.g., the second device) may disconnect the connection with the first device in the second communication mode.

Hereinafter, two modes of a master device switching a shared screen according to the disclosure will be described in detail.

First Mode (which May Also be Referred to as a Normal Mode)

Figure 3:
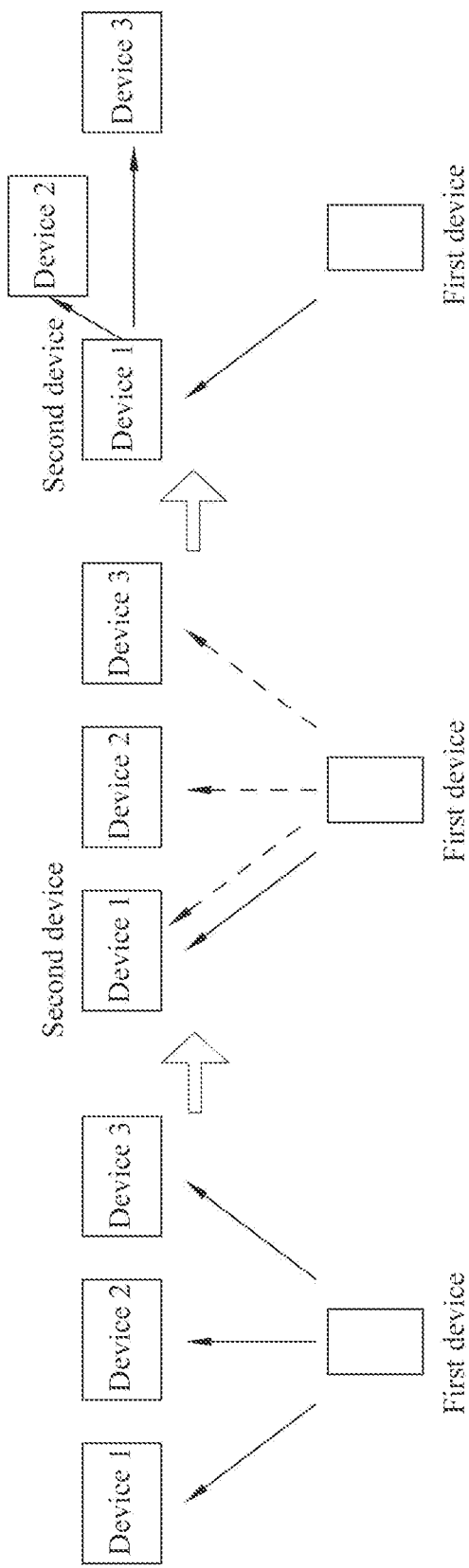
FIG. 3 is a schematic diagram illustrating a normal mode according to an embodiment of the disclosure.

FIG. 3 is a schematic diagram illustrating a normal mode according to an embodiment of the disclosure.

Referring to FIG. 3, a first device may establish a connection with a plurality of external devices in a second communication mode, and send, after establishing the connection, screen data to the plurality of external devices in real time in the second communication mode, to continue to share a screen. Subsequently, the first device may send the screen data in real time to a second device in a first communication mode, and the second device forwards the screen data received from the first device to another external device in real time, such that the second device continues to share the screen with the other external device. For example, after the second device establishes a connection with the first device and the other external device in the first communication mode, the screen data may be received from the first device in real time in the first communication mode, and the received screen data may be forwarded to the other external device in real time in the first communication mode. Subsequently, the first device may disconnect the connection with the plurality of external devices in the second communication mode.

Second Mode (which May Also be Referred to as an Extreme Mode)

Figure 4:
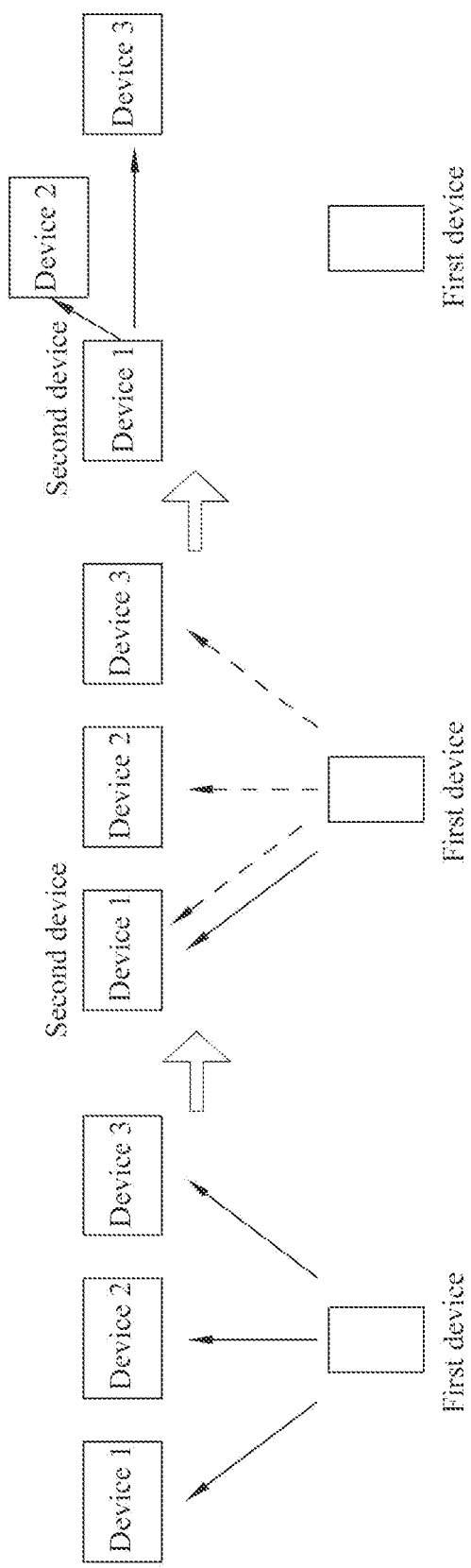
FIG. 4 is a schematic diagram illustrating an extreme mode according to an embodiment of the disclosure.

FIG. 4 is a schematic diagram illustrating an extreme mode according to an embodiment of the disclosure.

Referring to FIG. 4, a first device may establish a connection with a plurality of external devices in a second communication mode, and send, after establishing the connection, screen data to the plurality of external devices in real time in the second communication mode, to continue to share a screen. In addition, the first device may send data associated with a screen display content to a second device in a first communication mode, and the second device replaces the first device to continue to share the screen with another external device based on the data associated with the screen display content. For example, after the second device establishes a connection with the first device and the other external device in the first communication mode, the screen may be shared with the other external device in the first communication mode based on the data associated with the screen display content. Subsequently, the second device disconnects the connection with the first device in the first communication mode. That is, the first device exits the screen sharing function.

According to an embodiment of the disclosure, the data associated with the screen display content may include a shared screen file in use and a presentation progress of the file. The second device may acquire the screen data based on the file and the presentation progress of the file, and share the screen with the other external device based on the acquired screen data.

According to an embodiment of the disclosure, in addition to the shared screen file in use and the presentation progress of the file, the data associated with the screen display content may include at least one of a software installation package performing screen sharing and a subsequently usable shared screen file. The second device may install software performing screen sharing based on the software installation package performing the screen sharing. The second device may subsequently share the screen with the other external device based on the subsequently usable shared screen file. As an example, in the situation where the second device is not previously installed with the software, the first device may send the software installation package of the software to the second device, and the second device may install the software based on the received software installation package. In another example, if a to-be-shared screen file includes the subsequently usable shared screen file in addition to the shared screen file in use, the first device may further send the subsequently usable shared screen file to the second device, and the second device may subsequently share the screen with the other external device based on the subsequently usable shared screen file that is received. For example, when the subsequently usable shared screen file includes a plurality of files, the first device may further send a display order to the second device, or the display order may be manually controlled by the user.

According to an embodiment of the disclosure, the first device may acquire the data associated with the screen display content, package the data associated with the screen display content together, and send the packaged file to the second device. The shared screen file in use may refer to a file that is being shared and displayed across the first device and the plurality of external devices, for example, a document file or a video file. The presentation progress of the shared screen file may refer to that the file that is being shared and displayed across the first device and the plurality of external devices is being displayed to which position, for example, which page of the document file is opened on the software, and which frame of the video file is being played (or the video file plays to which moment). The subsequently usable shared screen file includes, but is not limited to, a file used when the software sharing the screen is opened by the user last time, a file opened by other software in a random access memory of a device, and the like. In addition, the first device may also send a related link of the shared screen file in use, the software installation package performing the screen sharing or the subsequently usable shared screen file to the second device, instead of sending the file itself. As an example, if the shared screen file in use or the subsequently usable shared screen file is not stored locally, but stored in an external device or downloaded from a network in real time, the first device may send a link for acquiring the shared screen file in use or the subsequently usable shared screen file to the second device, and the second device may acquire a corresponding file through the link. In another example, the first device may send a download link of the software installation package performing the screen sharing to the second device, and the second device may download and install the software performing the screen sharing through the download link, thereby saving the overhead of the short-range communication resource between the first device and the second device.

According to an embodiment of the disclosure, the first device and the second device may acquire the presentation progress of the shared screen file in a Deeplink mode or a memory block mode. For example, the Deeplink mode includes: learning a list of applications required to be kept in a state; learning, from a system layer, user interface (UI) interface identifiers currently run by these applications; keeping these applications and the UI interface identifiers in an application state database; and acquiring interface identifiers of the applications, and starting quickly a certain page of these applications by a Deeplink (but not limited to Deeplink). In another example, the memory block mode includes: learning a list of applications required to be kept in a state; learning, from a system layer, UI interface identifiers currently run by these applications; taking, for an application running in the background, an entire memory block of the application out by the system layer; and packaging the memory data.

According to an embodiment of the disclosure, in response to the current remaining power of the first device being lower than a first predetermined threshold but not lower than a second predetermined threshold, the first mode (i.e., the normal mode) is performed. In response to the current remaining power of the first device being lower than the second predetermined threshold, the second mode (i.e., the extreme mode) is performed. The first predetermined threshold may be greater than the second predetermined threshold. For example, the first predetermined threshold may be set to 30%, and the second predetermined threshold may be set to 5%. In addition, when the first device monitors that the current remaining charge of the first device decreases below the second predetermined threshold while running in the first mode, the first mode may be switched to the second mode, to perform the operation.

Figure 5:
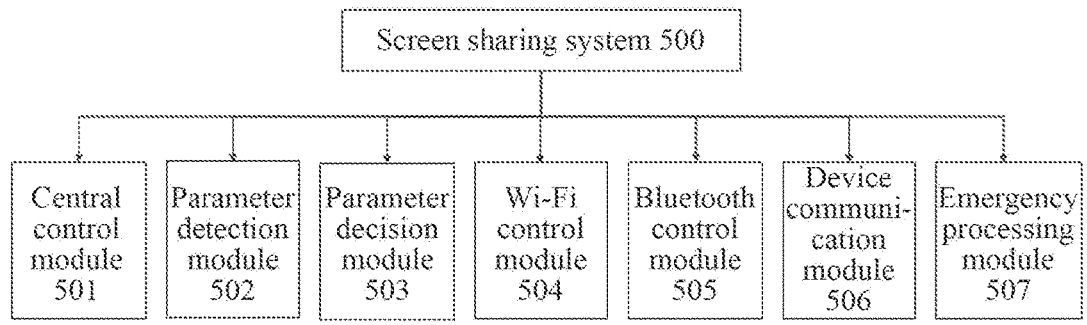
FIG. 5 is a schematic diagram illustrating a screen sharing system according to an embodiment of the disclosure.

FIG. 5 is a schematic diagram illustrating a screen sharing system according to an embodiment of the disclosure.

Figure 6:
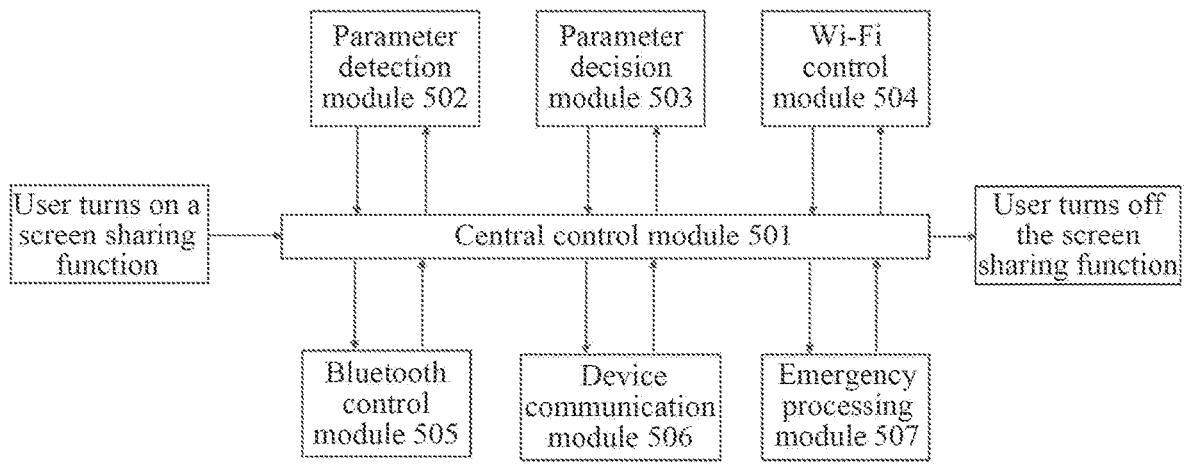
FIG. 6 is a schematic diagram illustrating working of modules of a screen sharing system according to an embodiment of the disclosure.

FIG. 6 is a schematic diagram illustrating working of modules of a screen sharing system according to an embodiment of the disclosure. A screen sharing system 500 according to an embodiment of the disclosure may be installed in each of a plurality of devices (e.g., the first device and the plurality of external devices as described above) that perform sharing of a screen across the plurality of devices, to be used to perform the function of sharing the screen by the plurality of devices.

Referring to FIGS. 5 and 6, the screen sharing system 500 according to the embodiment of the disclosure may include a central control module 501, a parameter detection module 502, a parameter decision module 503, a first communication mode control module (such as a Wi-Fi control module 504), a second communication mode control module (such as a Bluetooth control module 505), a device communication module 506, and an emergency processing module 507.

The central control module 501 is an overall process control module of the screen sharing system 500. When a user uses a screen sharing function, the central control module 501 may control the parameter detection module 502, the parameter decision module 503, the Wi-Fi control module 504, the Bluetooth control module 505, the device communication module 506, and the emergency processing module 507 to perform an operation.

The parameter detection module 502 refers to a module for acquiring a device parameter. The acquired parameter includes, but is not limited to, a remaining charge, a model number, a CPU, Wi-Fi, Bluetooth, and the like.

The parameter decision module 503 refers to a module for making a decision on whether to start an insensible switching opportunity currently and a module for making a decision on which device is currently a best candidate for a master device, according to the parameter fed back by the parameter detection portion. Accordingly, the parameter decision module 503 may include two modules, such as an opportunity decision module and a device decision module. The opportunity decision module is used for making a decision on whether to start the insensible switching opportunity currently or a decision on an opportunity to start insensible switching. The device decision module is used for making a decision on which device is currently the best candidate for the master device.

According to an embodiment of the disclosure, the opportunity decision module may determine and select a best insensible switching opportunity by adopting methods including, but not limited to, the following methods:

Method 1: Time at which a screen projection interface remains stable and unchanged within a certain time is selected.

Method 2: Time at which no user operation is received within a certain time is selected.

Method 3: No user operation within a certain subsequent time is prejudged according to an App interface on a current projected screen. For example, the current projected screen is the content of a certain page of a PPT, and the content of the next page of the PPT is a static image. Thus, the moment at which the user switches the screen to the next page is the best switching time.

The opportunity decision module may obtain an opportunity result through the above methods or any combination of the above methods.

According to an embodiment of the disclosure, the device decision module may make a decision on which device is currently the best candidate for the master device, by adopting methods including, but not limited to, the following methods:

Method 1: A device having a highest current remaining charge is selected.

Method 2: A device having a best current remaining charge and a best CPU is selected.

Method 3: A device that is currently being charged is selected.

The device decision module may obtain a best device result through the above methods.

The Wi-Fi control module 504 is a module of functions such as controlling Wi-Fi to initiate a connection, accepting a connection, and a connection authentication.

The Bluetooth control module 505 is a module of functions such as controlling Bluetooth to initiate a connection, accepting a connection, and a connection authentication.

The device communication module 506 refers to a module for communicating information between devices connected via Wi-Fi or Bluetooth. For example, a device A sends a message to a device B, the making and sending of the message of the device A are performed by the device communication module of the device A, and the analyzing and reading of the device B for the message are performed by the device communication module of the device B.

The emergency processing module 507 refers to a module for packaging and sending software used by a current device (i.e., the first device) for a screen projection, a file in use, a progress of the file and a subsequently usable file to a candidate device (i.e., a second device) in a second mode (extreme mode). For example, when the remaining charge of the first device is blower than a certain threshold (e.g., the remaining charge is only 5%), the screen sharing system 500 (e.g., the central control module 501) will start the extreme mode and the emergency processing module 507 will perform the corresponding operation.

Figure 7:
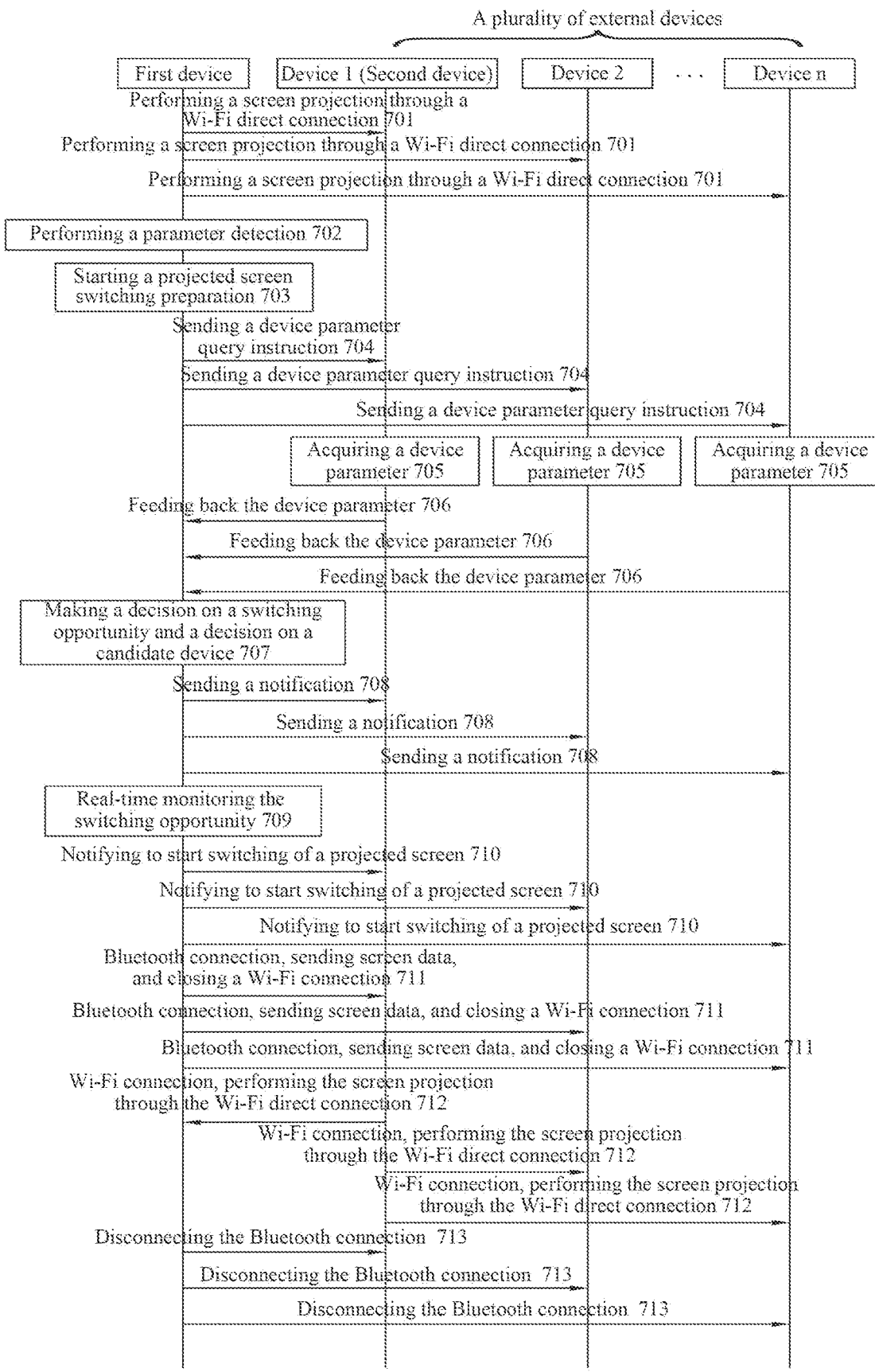
FIG. 7 is a schematic diagram illustrating a workflow of a master device switching a multi-device shared screen in a first mode according to an embodiment of the disclosure.

FIG. 7 is a schematic diagram illustrating a workflow of a master device switching a multi-device shared screen in a first mode according to an embodiment of the disclosure.

Referring to FIG. 7, in operation 701, a first device is connected to a plurality of external devices (e.g., but not limited to, a device 1, a device 2, a device n) through the Wi-Fi control module 504. For example, when a user uses the first device to turn on a screen projection function, the first device and the plurality of external devices perform a screen projection operation through a Wi-Fi direct connection. The screen of the first device is synchronously shared with the plurality of external devices, and is synchronously displayed.

In operation 702, the parameter detection module 502 of the first device periodically detects remaining charge of the first device. The parameter detection module 502 of the first device is not limited to the detection for the remaining charge, and may also detect a parameter such as a model number, a CPU, Wi-Fi, and Bluetooth.

In operation 703, when the parameter detection module 502 of the first device detects that the remaining charge of the first device is lower than a first predetermined threshold, the central control module 501 is notified, and the central control module 501 starts a projected screen switching preparation in response to the notification.

In operation 704, the central control module 501 of the first device controls the device communication module 506 to send a device parameter query instruction to the plurality of external devices.

In operation 705, after receiving the device parameter query instruction, the device communication module 506 of each external device in the plurality of external devices notifies the central control module 501 of the device. The central control module 501 of each external device may acquire a device parameter (e.g., a current remaining charge, a current CPU capability, information on whether being charged, and an ID) of the device through the parameter detection module 502 of the device.

In operation 706, after acquiring the device parameter of the device, the central control module 501 of each external device in the plurality of external devices controls the device communication module 506 to feed back the device parameter to the first device.

In operation 707, after receiving the device parameters fed back by the plurality of external devices, the device communication module 506 of the first device feeds back the device parameters to the central control module 501, and the central control module 501 sends the device parameters to the parameter decision module 503, and controls the parameter decision module 503 to make a decision based on the device parameters, and to feed back a decision result (e.g., a decision on a switching opportunity and a decision on a candidate device) to the central control module 501. It is assumed that the device 1 is determined as a candidate device (i.e., a second device).

In operation 708, the central control module 501 of the first device may notify the plurality of external devices of the decision result for the candidate device through the device communication module 506. For example, the first device may send the ID of the candidate device to another external device other than the second device in the plurality of external devices, and send the ID of the other external device other than the second device in the plurality of external devices to the second device.

In operation 709, the central control module 501 of the first device monitors whether the first device meets a switching condition in real time according to the switching opportunity fed back by the parameter decision module 503.

In operation 710, when the switching condition is met, the parameter detection module 502 of the first device will notify the central control module 501. The central control module 501 of the first device will notify the plurality of external devices through the device communication module 506 to start switching of a projected screen.

In operation 711, the central control module 501 of the first device initiates a Bluetooth connection request to the plurality of external devices through the Bluetooth control module 505. The Bluetooth control modules 505 of the plurality of external devices will also start an instruction to accept a Bluetooth connection. After the establishment of the Bluetooth connection between the first device and the plurality of external devices is completed, the first device may send the screen data to the plurality of external devices in real time via Bluetooth to continue sharing the screen with the plurality of external devices. In addition, after the Bluetooth connection is completed, the central control module 501 of the first device may notify the Wi-Fi control module 504 to close the connection between the first device and the plurality of external devices in the first communication mode, or close the connection between the first device and the other external device other than the second device in the plurality of external devices in the first communication mode.

In operation 712, the central control module 501 of the second device initiates a request for a Wi-Fi direct connection to the first device and the other external device other than the second device in the plurality of external devices or to the other external device other than the second device in the plurality of external devices through the Wi-Fi control module 504. The Wi-Fi control modules 504 of the first device and the other external device other than the second device in the plurality of external devices or the Wi-Fi control module 504 of the other external device other than the second device in the plurality of external devices will also start an instruction for a Wi-Fi direct connection with the second device. After the establishment of the Wi-Fi direct connection between the second device and the first device and between the second device and the other external device other than the second device in the plurality of external devices is completed, the first device may send the screen data to the second device in real time through the Wi-Fi direct connection, and the second device may forward the received screen data to the other external device in real time through the Wi-Fi direct connection, to share the screen.

In operation 713, the central control module 501 of the second device sends an instruction to disconnect the Bluetooth connection to the first device and the other external device other than the second device in the plurality of external devices through the device communication module 506. After receiving the instruction, the device communication modules 506 of the first device and the other external device other than the second device in the plurality of external devices notify their respective central control modules 501. The central control module 501 of the first device controls the Bluetooth control module 505 of the first device to disconnect the Bluetooth connection with the plurality of external devices, and thus, the function of switching the projected screen is completed.

Figure 8:
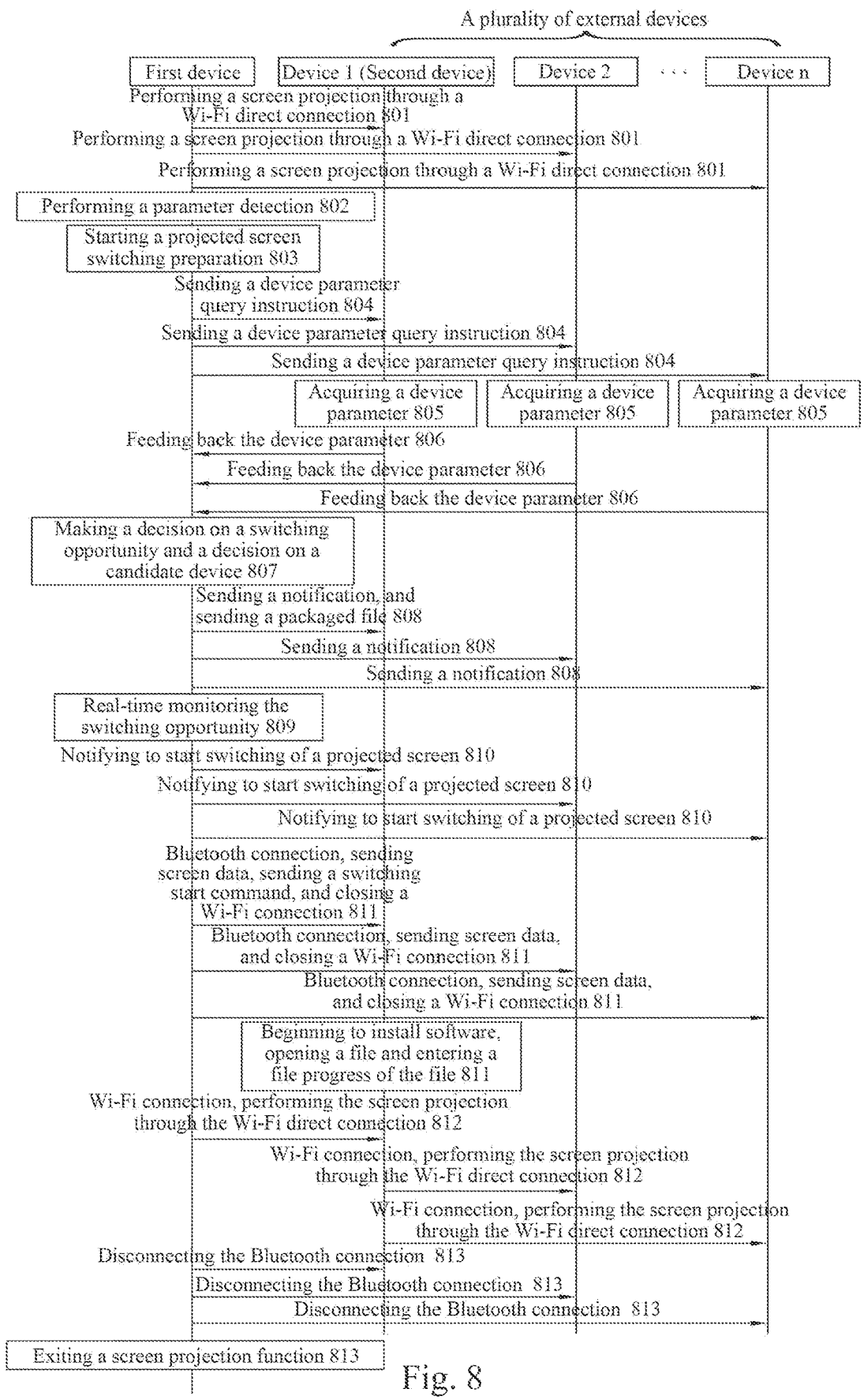
FIG. 8 is a schematic diagram illustrating a workflow of a master device switching a multi-device shared screen in a second mode according to an embodiment of the disclosure.

FIG. 8 is a schematic diagram illustrating a workflow of a master device switching a multi-device shared screen in a second mode according to an embodiment of the disclosure.

Referring to FIG. 8, in operation 801, a first device is connected to a plurality of external devices (e.g., a device 1, a device 2, and a device 3) through the Wi-Fi control module 504. For example, when a user uses the first device to turn on a screen projection function, the first device and the plurality of external devices perform a screen projection operation through a Wi-Fi direct connection. That is, the screen of the first device is synchronously shared with the plurality of external devices, and is synchronously displayed.

In operation 802, the parameter detection module 502 of the first device periodically detects a remaining charge of the first device. The parameter detection module 502 of the first device is not limited to the detection for the remaining charge, and may also detect a parameter such as a model number, a CPU, Wi-Fi, and Bluetooth.

In operation 803, when the parameter detection module 502 of the first device detects that the remaining charge of the first device is lower than a second predetermined threshold, the central control module 501 is notified, and the central control module 501 initiates a projected screen switching preparation in response to the notification.

In operation 804, the central control module 501 of the first device controls the device communication module 506 to send a device parameter query instruction to the plurality of external devices.

In operation 805, after receiving the device parameter query instruction, the device communication module 506 of each external device in the plurality of external devices notifies the central control module 501 of the device. The central control module 501 of each external device may acquire a device parameter (e.g., a current electric charge, a current CPU capability, information on whether being charged, and an ID) of the device through the parameter detection module 502 of the device.

In operation 806, after acquiring the device parameter of the device, the central control module 501 of each external device in the plurality of external devices controls the device communication module 506 to feed back the device parameter to the first device.

In operation 807, after receiving the device parameters fed back by the plurality of external devices, the device communication module 506 of the first device feeds back the device parameters to the central control module 501. The central control module 501 sends the device parameters to the parameter decision module 503, and controls the parameter decision module 503 to make a decision based on the device parameters, and to feed back a decision result (e.g., a decision on a switching opportunity and a decision on a candidate device) to the central control module 501.

In operation 808, the central control module 501 of the first device may notify the plurality of external devices of the decision result for the candidate device (i.e., a second device) through the device communication module 506. For example, the first device may send the ID of the candidate device to another external device other than the second device in the plurality of external devices, and send the ID of the other external device other than the second device in the plurality of external devices to the second device.

In addition, since the remaining charge of the first device is lower than the second predetermined threshold (i.e., reaches a lower level), the central control module 501 of the first device may start a second mode (i.e., an extreme mode). In the second mode, the central control module 501 of the first device may control the emergency processing module 507 to package a software installation package used by a current device for a screen projection, a file in use, a progress of the file and a subsequently usable file together, and notify the device communication module 506 to transmit the packaged file to the second device.

According to an embodiment of the disclosure, the progress of the file includes, but is not limited to, which page of a document file is opened on software, and which frame of a video file is being played (or the video file plays to which moment). The subsequently usable shared screen file includes, but is not limited to, a file opened by other software in a random access memory of a device, a file used when the screen projection software is opened by the user last time, and the like.

According to an embodiment of the disclosure, the progress of the file includes, but is not limited to, information including:

Method 1 (Deeplink Mode):
1. A list of applications required to be kept in a state is learned.
2. UI interface identifiers currently run by these applications are learned from a system layer.
3. These applications and the UI interface identifiers are kept in an application state database.
4. The emergency processing portion acquires interface identifiers of the applications, and quickly starts a certain page of these applications by, but not limited to, a Deeplink.

Method 2 (Memory Block Pattern):
1. A list of applications required to be kept in a state is learned.
2. UI interface identifiers currently run by these applications are learned from a system layer.
3. For an application running in the background, an entire memory block of the application is taken out by the system layer
4. The emergency processing module 507 packages the memory data.

In operation 809, the central control module 501 of the first device monitors whether the first device meets a switching condition in real time according to the switching opportunity fed back by the parameter decision module 503.

In operation 810, when the switching condition is met, the parameter detection module 502 of the first device will notify the central control module 501. The central control module 501 of the first device will notify the plurality of external devices through the device communication module 506 to start switching of a projected screen.

In operation 811, the central control module 501 of the first device initiates a Bluetooth connection request to the plurality of external devices through the Bluetooth control module 505. The Bluetooth control modules 505 of the plurality of external devices will also start an instruction to accept a Bluetooth connection. After the establishment of the Bluetooth connection between the first device and the plurality of external devices is completed, the first device may send screen data to the plurality of external devices in real time via Bluetooth to continue sharing the screen with the plurality of external devices. In addition, the first device may send a switching start command to the second device through the device communication module 506. After receiving the switching start command, the second device starts to install the software, opens the file, and enters the file progress of the file based on the received packaged file.

According to an embodiment of the disclosure, the method of entering the file progress includes, but is not limited to, the following methods:

Method 1 (Deeplink Mode):

If the emergency processing module 507 of the first device saves the interface identifier of the application, the interface identifier is added to the default Deeplink of the application. For example, the default Deeplink is XXX://example.com/methodDeepLink/{param1}, and the interface identifier is the value of {param1}. The value is assigned to the default Deeplink, and thus, the Deeplink can directly jump to a corresponding interface of the application.

Method 2 (Memory Block Pattern):

If the emergency processing module 507 of the first device saves the memory block of the application, the second device installs and opens the application, and replaces, in the random access memory, the memory block of the application with the memory block of the first device.

After the Bluetooth connection is completed, the central control module 501 of the first device may notify the Wi-Fi control module 504 to close the connection between the first device and the plurality of external devices in the first communication mode, or close the connection between the first device and the other external device other than the second device in the plurality of external devices in the first communication mode.

In operation 812, the central control module 501 of the second device initiates a request for a Wi-Fi direct connection to the first device and the other external device other than the second device in the plurality of external devices or to the other external device other than the second device in the plurality of external devices through the Wi-Fi control module 504. The Wi-Fi control modules 504 of the first device and the other external device other than the second device in the plurality of external devices or the Wi-Fi control module 504 of the other external device other than the second device in the plurality of external devices will also start an instruction for a Wi-Fi direct connection with the second device. After the establishment of the Wi-Fi direct connection between the second device and the first device and between the second device and the other external device other than the second device in the plurality of external devices is completed, the second device may continue to share the screen with the other external device through the Wi-Fi direct connection, based on the acquired file and the acquired file progress.

In operation 813, the central control module 501 of the second device sends an instruction to disconnect the Bluetooth connection to the first device and the other external device other than the second device in the plurality of external devices through the device communication module 506. After receiving the instruction, the device communication modules 506 of the first device and the other external device other than the second device in the plurality of external devices notify their respective central control modules 501. The central control module 501 of the first device controls the Bluetooth control module 505 of the first device to disconnect the Bluetooth connection with the plurality of external devices, controls the Wi-Fi control module 504 of the first device to disconnect the Wi-Fi connection with the second device (this operation may also be completed in operations 811 or 812), and exits the screen projection function, and thus, the function of switching the projected screen is completed.

Figure 9:
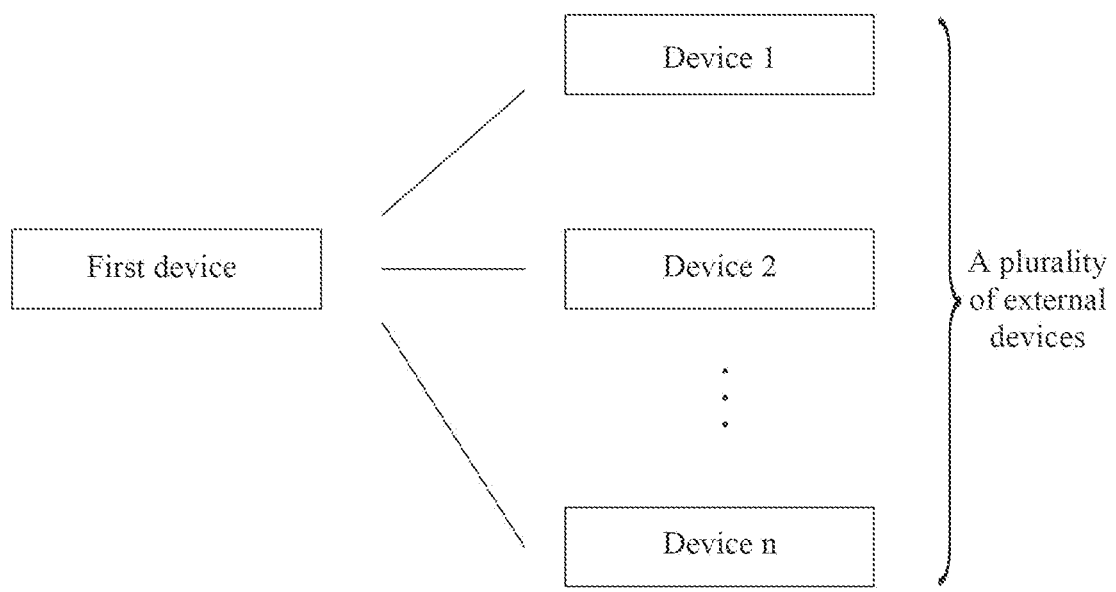
FIG. 9 is a schematic diagram illustrating a system for sharing a screen by a plurality of devices according to an embodiment of the disclosure.

FIG. 9 is a schematic diagram illustrating a system for sharing a screen by a plurality of devices according to an embodiment of the disclosure.

Referring to FIG. 9, the system 900 for sharing a screen by a plurality of devices according to an embodiment of the disclosure may include a first device and a plurality of external devices. For example, the plurality of external devices may include a device 1, a device 2, and a device n.

The first device is connected with the plurality of external devices in a first communication mode, and shares a screen with the plurality of external devices. In response to satisfying a first preset condition, the first device determines a second device from the plurality of external devices. The first device continues to share the screen with the plurality of external devices in a second communication mode, and sends screen data or data associated with a screen display content to the second device in the first communication mode. The second device replaces the first device to continue to share the screen with another external device other than the second device in the plurality of external devices in the first communication mode, based on the received screen data or the received data associated with the screen display content. In response to the second device successfully continuing to share the screen with the other external device, the first device disconnects a connection with the plurality of external devices in the second communication mode.

The operations of the first device and the second device in the system for sharing a screen by a plurality of devices are described below with reference to FIGS. 10 and 11.

Figure 10:
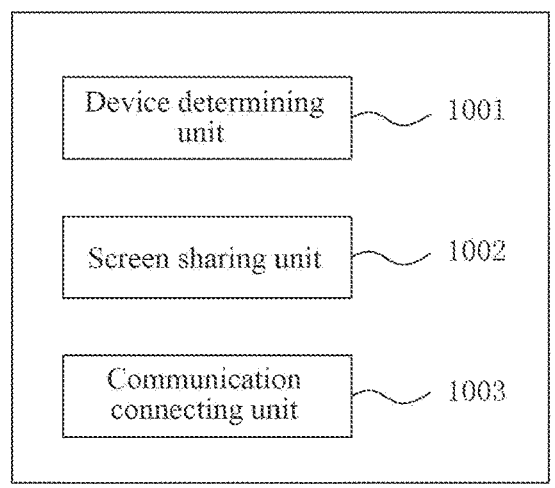
FIG. 10 is a block diagram illustrating a first device according to an embodiment of the disclosure.

FIG. 10 is a block diagram illustrating a first device according to an embodiment of the disclosure.

Figure 11:
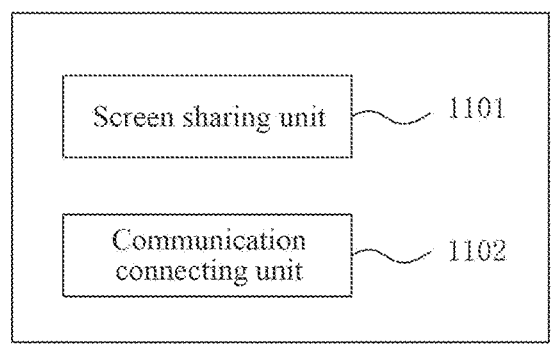
FIG. 11 is a block diagram illustrating a second device according to an embodiment of the disclosure.

FIG. 11 is a block diagram illustrating a second device according to an embodiment of the disclosure.

Referring to FIGS. 10 and 11, a first device 1000 may include a device determining unit 1001, a screen sharing unit 1002 and a communication connecting unit 1003, and a second device 1100 may include a screen sharing unit 1101 and a communication connecting unit 1102.

The device determining unit 1001 of the first device 1000 determines a second device from a plurality of external devices, in response to satisfying a first preset condition.

According to an embodiment of the disclosure, the first preset condition may be that a current remaining charge of the first device is lower than a predetermined threshold. When it is detected that the remaining charge of the first device is lower than the predetermined threshold, a function of switching a master device may be started.

According to an embodiment of the disclosure, the device determining unit 1001 of the first device 1000 may acquire status information of the plurality of external devices (i.e., the plurality of external devices (e.g., a sending unit (not shown) of the second device 1100) send respective status information to the first device 1000), and determine, based on the acquired status information, the second device from the plurality of external devices according to a first rule. The device determining unit 1001 of the first device 1000 determines the second device as a new master device after the switching. For example, the status information may include at least one of a current remaining charge, a current CPU capability, and information on whether being charged. The first rule may include: selecting an optimal device from the plurality of external devices based on one or more of the current remaining charge, the current CPU capability, and the information on whether being charged. For example, the method of determining (or selecting) the second device includes, but is not limited to, Method 1: selecting a device having a highest current remaining charge in the plurality of external devices; Method 2: selecting a device having a best current remaining charge and a best current CPU capability in the plurality of external devices; and Method 3: selecting a device that is currently being charged in the plurality of external devices.

Alternatively, the second device may be determined through a superposition of the above methods. A device having a best status may be determined by comprehensively considering each piece of status information. For example, the device determining unit 1001 of the first device 1000 may assign each kind of status information a weight value, add weight values of various kinds of status information of each external device in the plurality of external devices to obtain an integrated status value of each external device, select a device having a best integrated status value.

According to an embodiment of the disclosure, the device determining unit 1001 of the first device 1000 may determine the second device by receiving information of specifying the second device from a user. For example, when satisfying the first preset condition, the device determining unit 1001 of the first device 1000 may pop up an option to provide a candidate device range, for the user to manually select the second device from the candidate device range. As an example, the device determining unit 1001 of the first device 1000 may provide the plurality of external devices for the user to select. As another example, according to the status information of the plurality of external devices, the device determining unit 1001 of the first device 1000 may select a plurality of devices having an excellent status as candidate devices for the user to select. For example, the device determining unit 1001 of the first device 1000 may provide at least one device satisfying a second preset condition in the plurality of external devices for selection; and determine, in response to a selection of the user from the at least one device, a device selected by the user as the second device. The second preset condition may be that a status of a device reaches a certain threshold range. For example, the second preset condition may include: the current remaining charge of the device being greater than or equal to 70%; the current remaining charge of the device being greater than or equal to 70% and the current CPU occupation rate of the device being less than or equal to 50%; the device that is being charged; or the like.

The way in which the device determining unit 1001 of the first device 1000 determines the second device from the plurality of external devices is not limited to the above embodiments. The second device may also be determined in any possible way, for example, the second device may be a pre-specified device or the like.

The screen sharing unit 1002 of the first device 1000 continues to share a screen with the plurality of external devices in a second communication mode, such as Bluetooth, and sends screen data or data associated with a screen display content to the second device in a first communication mode. The first communication mode is different from the second communication mode. In response to the first device satisfying the first preset condition, the plurality of external devices (e.g., the screen sharing unit 1101 of the second device 1100) continue to accept the screen shared by the first device in the second communication mode, and the screen sharing unit 1101 of the second device 1100 receives the screen data or the data associated with the screen display content from the first device in the first communication mode.

The screen sharing unit 1101 of the second device 1100 replaces the first device to continue to share the screen with another external device other than the second device in the plurality of external devices, based on the received screen data or the received data associated with the screen display content.

In response to the second device successfully continuing to share the screen with the other external device other than the second device in the plurality of external devices, the communication connecting unit 1003 of the first device 1000 disconnects a connection with the plurality of external devices in the second communication mode. That is, in response to the second device successfully continuing to share the screen with the other external device other than the second device in the plurality of external devices, the plurality of external devices (e.g., the communication connecting unit 1102 of the second device 1100) may disconnect the connection with the first device in the second communication mode.

According to an embodiment of the disclosure, the first device 1000 may further include an opportunity determining unit (not shown). In response to satisfying the first preset condition, the opportunity determining unit of the first device 1000 may acquire at least one of a current screen content and an operating situation of a current user for the screen content, and determine a switching opportunity based on at least one of the acquired current screen content and the acquired operating situation of the current user for the screen content. When the determined switching opportunity is reached, the screen sharing unit 1002 of the first device 1000 begins to continue to share the screen with the plurality of external devices in the second communication mode. For example, the opportunity determining unit of the first device 1000 determines the switching opportunity according to whether the current screen content changes and/or a frequency at which the user operates on a projected screen. The method in which the opportunity determining unit of the first device 1000 determines the switching opportunity may include, but is not limited to, Method 1: selecting time at which a screen of a screen projection interface remains stable and unchanged within a certain time; Method 2: selecting time at which no user operation is received within a certain time; and Method 3: prejudging no user operation within a certain subsequent time according to an App interface on a current projected screen. For example, when the current projected screen is the content of a certain page of a PPT, and the content of the next page of the PPT is a static image, and thus, the moment at which the user switches the screen to the next page is the best switching time. In addition, the opportunity determining unit of the first device 1000 may also determine the best switching opportunity by comprehensively considering the above methods.

In addition, the method in which the opportunity determining unit of the first device 1000 determines the switching opportunity is not limited to the above methods. The switching opportunity may also be determined in other possible ways. For example, the switching opportunity may be triggered manually by the user to start the switching.

According to an embodiment of the disclosure, the first device 1000 may further include a sending unit (not shown). After the second device is determined, the sending unit of the first device 1000 may send a notification concerning that the second device replaces the first device to perform the sharing of the screen to the plurality of external devices, to notify the plurality of external devices that the second device is selected as the new master device sharing the screen. For example, the sending unit of the first device 1000 may send the ID of the second device to the other external device, and send the ID of the other external device to the second device to notify the second device that the second device needs to share the screen with which devices.

Accordingly, the second device 1100 may further include a receiving unit (not shown). The receiving unit of the second device 1100 receives the ID of the other external device from the first device. The screen sharing unit 1101 of the second device 1100 performs the connection with the other external device in the first communication mode through the communication connecting unit 1102 based on the ID of the other external device, and replaces the first device to continue to share the screen with the other external device in the first communication mode. In addition, after the opportunity determining unit of the first device 1000 determines the switching opportunity, the sending unit of the first device 1000 may notify the plurality of external devices of the switching opportunity.

According to an embodiment of the disclosure, the second device 1100 may further include the sending unit (not shown). After the second device 1100 successfully continues to share the screen with the other external device, the sending unit of the second device 1100 sends an instruction to disconnect the connection in the second communication mode to the first device and the other external device. In response to receiving the instruction, the communication connecting unit 1003 of the first device 1000 disconnects the connection with the plurality of external devices in the second communication mode. Thus, the plurality of external devices (e.g., the communication connecting unit 1102 of the second device 1100) may disconnect the connection with the first device in the second communication mode.

According to an embodiment of the disclosure, in a first mode, the screen sharing unit 1002 of the first device 1000 may establish a connection with the plurality of external devices in the second communication mode through the communication connecting unit 1003, and send, after establishing the connection, screen data to the plurality of external devices in real time in the second communication mode, to continue to share the screen. Subsequently, the screen sharing unit 1002 of the first device 1000 may send the screen data in real time to the second device in a first communication mode, and the screen sharing unit 1101 of the second device 1100 forwards the screen data received from the first device to the other external device in real time, such that the second device continues to share the screen with the other external device. For example, after the second device establishes a connection with the first device and the other external device in the first communication mode, the screen sharing unit 1101 of the second device 1100 may receive the screen data from the first device in real time in the first communication mode, and forward the received screen data to the other external device in real time in the first communication mode. Subsequently, the communication connecting unit 1003 of the first device 1000 may disconnect the connection with the plurality of external devices in the second communication mode.

According to an embodiment of the disclosure, in a second mode, the screen sharing unit 1002 of the first device 1000 may establish a connection with the plurality of external devices in the second communication mode through the communication connecting unit 1003, and send, after establishing the connection, screen data to the plurality of external devices in real time in the second communication mode, to continue to share the screen. In addition, the screen sharing unit 1002 of the first device 1000 may send data associated with a screen display content to the second device in the first communication mode, and the screen sharing unit 1101 of the second device 1100 replaces the first device to continue to share the screen with the other external device, based on the data associated with the screen display content. For example, after the second device establishes a connection with the first device and the other external device in the first communication mode, the screen sharing unit 1101 of the second device 1100 may the screen with the other external device in the first communication mode, based on the data associated with the screen display content. Subsequently, the communication connecting unit 1102 of the second device 1100 disconnects the connection with the first device in the first communication mode. That is, the first device exits the screen sharing function.

According to an embodiment of the disclosure, the data associated with the screen display content may include a shared screen file in use and a presentation progress of the file. The screen sharing unit 1101 of the second device 1100 may acquire the screen data based on the file and the presentation progress of the file, and share the screen with the other external device based on the acquired screen data.

According to an embodiment of the disclosure, in addition to the shared screen file in use and the presentation progress of the file, the data associated with the screen display content may include at least one of a software installation package performing screen sharing and a subsequently usable shared screen file. The screen sharing unit 1101 of the second device 1100 may install software performing screen sharing based on the software installation package performing the screen sharing. The screen sharing unit 1101 of the second device 1100 may subsequently share the screen with the other external device based on the subsequently usable shared screen file. As an example, in the situation where the second device is not previously installed with the software, The screen sharing unit 1002 of the first device 1000 may send the software installation package of the software to the second device, and the screen sharing unit 1101 of the second device 1100 may install the software based on the received software installation package. As another example, if a to-be-shared screen file includes the subsequently usable shared screen file in addition to the shared screen file in use, the screen sharing unit 1002 of the first device 1000 may further send the subsequently usable shared screen file to the second device, and the screen sharing unit 1101 of the second device 1100 may subsequently share the screen with the other external device based on the subsequently usable shared screen file that is received. For example, when the subsequently usable shared screen file includes a plurality of files, the screen sharing unit 1002 of the first device 1000 may further send a display order to the second device, or the display order may be manually controlled by the user.

According to an embodiment of the disclosure, the screen sharing unit 1002 of the first device 1000 may acquire the data associated with the screen display content, package the data associated with the screen display content together, and send the packaged file to the second device. The shared screen file in use may refer to a file that is being shared and displayed across the first device and the plurality of external devices, for example, a document file or a video file. The presentation progress of the shared screen file may refer to that the file that is being shared and displayed across the first device and the plurality of external devices is being displayed to which position, for example, which page of the document file is opened on the software, and which frame of the video file is being played (or the video file plays to which moment). The subsequently usable shared screen file includes, but is not limited to, a file used when the software sharing the screen is opened by the user last time, a file opened by other software in a random access memory of a device, and the like.

In addition, the screen sharing unit 1002 of the first device 1000 may also send a related link of the shared screen file in use, the software installation package performing the screen sharing or the subsequently usable shared screen file to the second device, instead of sending the file itself. As an example, if the shared screen file in use or the subsequently usable shared screen file is not stored locally, but stored in an external device or downloaded from a network in real time, the screen sharing unit 1002 of the first device 1000 may send a link for acquiring the shared screen file in use or the subsequently usable shared screen file to the second device, and the second device may acquire a corresponding file through the link. As another example, the screen sharing unit 1002 of the first device 1000 may send a download link of the software installation package performing the screen sharing to the second device, and the second device may download and install the software performing the screen sharing through the download link, thereby saving the overhead of the short-range communication resource between the first device and the second device.

According to an embodiment of the disclosure, in response to the current remaining charge of the first device 1000 being lower than a first predetermined threshold but not lower than a second predetermined threshold, the first device 1000 and the second device 1100 perform the first mode (i.e., a normal mode). In response to the current remaining charge of the first device being lower than the second predetermined threshold, the first device 1000 and the second device 1100 perform the second mode (i.e., an extreme mode). Here, the first predetermined threshold is greater than the second predetermined threshold. For example, the first predetermined threshold may be set to 30%, and the second predetermined threshold may be set to 5%. In addition, when the first device 1000 monitors that the current remaining charge of the first device decreases below the second predetermined threshold while running in the first mode, the first device 1000 and the second device 1100 may switch from the first mode to the second mode, to perform the operation.

Figure 12:
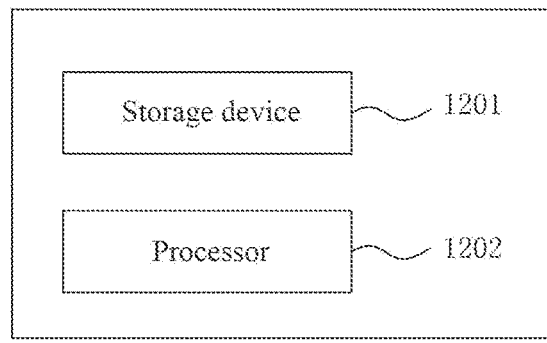
FIG. 12 is a block diagram of an electronic device 1200 according to an embodiment of the disclosure.

FIG. 12 is a block diagram of an electronic device 1200 according to an embodiment of the disclosure.

Referring to FIG. 12, the electronic device 1200 includes at least one storage device 1201 and at least one processor 1202. The at least one storage device 1201 stores a computer executable instruction set. The computer executable instruction set, when being executed by the at least one processor 1202, performs the processing method for the first device or the processing method for the second device according to the embodiments of the disclosure.

As an example, the electronic device 1200 may be a PC computer, a tablet apparatus, a personal digital assistant, a smart phone, or other apparatuses capable of executing the above instruction set. The electronic device 1200 is not necessarily a single electronic device, but may be any collection of apparatuses or circuits capable of separately or jointly executing the above instruction (or instruction set). The electronic device 1200 may also be a portion of an integrated control system or system manager, or may be configured as a portable electronic device interconnected locally or remotely (e.g., via wireless transmission) through an interface.

In the electronic device 1200, the processor 1202 may include a central processing unit (CPU), a graphics processing unit (GPU), a programmable logic apparatus, a dedicated processor system, a microcontroller, or a microprocessor. As an example rather than a limitation, the processor may further include an analog processor, a digital processor, a microprocessor, a multi-core processor, a processor array, a network processor, and the like.

The processor 1202 may run the instructions or codes stored in the storage device 1201. Here, the storage device 1201 may further store data. The instructions and the data may also be transmitted and received over the network via a network interface apparatus. The network interface apparatus may employ any known transmission protocol.

The storage device 1201 may be integrated with the processor 1202, for example, a random access memory (RAM) or flash memory is disposed within an integrated circuit microprocessor or the like. In addition, the storage device 1201 may include a separate apparatus, such as an external disk drive, a storage array, or other storage apparatuses that any database system may use. The storage device 1201 and the processor 1202 may be operatively coupled, or may communicate with each other (e.g., through an I/O port and a network connection), to enable the processor 1202 to read the data stored in the storage device.

In addition, the electronic device 1200 may further include a video display (e.g., a liquid crystal display) and a user interaction interface (e.g., a keyboard, a mouse and a touch input apparatus). All components of the electronic device 1200 may be connected to each other via a bus and/or a network.

According to an embodiment of the disclosure, a computer readable storage medium storing an instruction may further be provided. The instruction, when being executed by the at least one processor, causes the at least one processor to perform the processing method for the first device or the processing method for the second device according to the disclosure. Examples of the computer readable storage medium herein include: a read-only memory (ROM), a random access programmable read-only memory (PROM), an electrically erasable programmable read-only memory (EEPROM), a random access memory (RAM), a dynamic random access memory (DRAM), a static random access memory (SRAM), a flash memory, a non-volatile memory, a CD-ROM, a CD-R, a CD+R, a CD-RW, a CD+RW, a DVD-ROM, a DVD-R, a DVD+R, a DVD-RW, a DVD+RW, a DVD-RAM, a BD-ROM, a BD-R, a BD-R LTH, a BD-RE, a Blu-ray or optical disk memory, a hard disk drive (HDD), a solid state disk (SSD), a card memory (e.g., a multimedia card, a secure digital (SD) card or an extreme digital (XD) card), a magnetic tape, a floppy disk, a magneto-optical data storage apparatus, an optical data storage apparatus, a hard disk, a solid state disk, and any other apparatus. The any other apparatus is configured to store a computer program and any associated data, data file and data structure in a non-transitory way, and provide the computer program and the any associated data, data file and data structure for a processor or a computer, to enable the processor or the computer to execute the computer program. The computer program in the above computer readable storage medium may run in an environment deployed in a computer device such as a client, a host, a proxy apparatus and a server. In addition, in an example, the computer program and the any associated data, data file and data structure are distributed over a networked computer system, such that the computer program and the any associated data, data file and data structure are stored, accessed and executed in a distributed way by one or more processors or computers.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A processing method for a first device, the first device being connected with a plurality of external devices in a first communication mode, the processing method comprising:
   sharing a screen with the plurality of external devices via the first communication mode;
   determining a second device from the plurality of external devices, in response to satisfying a first preset condition;
   establishing a connection with the plurality of external devices in a second communication mode;
   continuing to share the screen with the plurality of external devices in the second communication mode;
   sending screen data or data associated with a screen display content to the second device in the first communication mode, to cause the second device to replace the first device, such that the second device continues to share the screen with the other external devices; and
   disconnecting a connection with the plurality of external devices in the second communication mode, in response to the second device successfully continuing to share the screen with the other external devices,
   wherein the determining of the second device from the plurality of external devices comprises:
      acquiring status information of the plurality of external devices, and
      determining the second device from the plurality of external devices based on one or more of a current remaining charge, a current central processing unit (CPU) capability and information on whether being charged, and
   wherein the first communication mode is different from the second communication mode.

2. The method according to claim 1, wherein the sending of the screen data to the second device in the first communication mode comprises:
   sending the screen data to the second device in real time in the first communication mode, to cause the second device to forward the screen data received from the first device to the other of the plurality of external devices in real time.

3. The method according to claim 1,
   wherein the data associated with the screen display content comprises a shared screen file in use and a presentation progress of the shared screen file, and
   wherein the method further comprises:
      disconnecting a connection with the second device in the first communication mode, in response to the second device successfully continuing to share the screen with the other external device.

4. The method according to claim 3, wherein the data associated with the screen display content further comprises at least one of a software installation package performing screen sharing and a subsequently usable shared screen file.

5. The method according to claim 1, wherein the first preset condition is a current remaining charge of the first device being lower than a predetermined threshold.

6. The method according to claim 5, further comprising:
   sending the screen data to the second device in real time in the first communication mode, to cause the second device to forward the screen data received from the first device to the other external devices in real time, in response to the current remaining charge of the first device being lower than a first predetermined threshold but not lower than a second predetermined threshold; and
   disconnecting a connection with the second device in the first communication mode, in response to the second device successfully continuing to share the screen with the other external devices in response to the current remaining charge of the first device being lower than the second predetermined threshold,
   wherein the first predetermined threshold is greater than the second predetermined threshold.

7. The method according to claim 1,
   wherein the status information comprises at least one of the current remaining charge, the current CPU capability and the information on whether being charged.

8. The method according to claim 1, wherein the determining of the second device from the plurality of external devices comprises:
   providing at least one device satisfying a second preset condition in the plurality of external devices for selection; and
   determining, in response to a selection of a user from the at least one device, a device selected by the user as the second device.

9. The method according to claim 1, further comprising:
   acquiring at least one of a current screen content and an operating situation of a current user for the screen content, in response to satisfying the first preset condition; and
   determining a switching opportunity based on at least one of the acquired current screen content and the acquired operating situation of the current user for the screen content,
   wherein the continuing to share the screen with the plurality of external devices in a second communication mode comprises:
      beginning to perform the continuing to share the screen with the plurality of external devices in a second communication mode, when the determined switching opportunity is reached.

10. The method according to claim 1,
    wherein the second device replaces the first device so as to continue to share the screen with the other external device in the first communication mode, and
    wherein the method further comprises:
       sending, after determining the second device, an identifier (ID) of the second device to the other external devices in the first communication mode, and
       sending an ID of the other external device to the second device, wherein the second device performs a connection with the other external device in the first communication mode, based on the ID of the other external device.

11. The method according to claim 1, wherein the continuing to share the screen with the plurality of external devices in a second communication mode comprises:
    sending, after establishing the connection, the screen data to the plurality of external devices in real time in the second communication mode, to continue to share the screen.

12. The method according to claim 1,
    wherein the disconnecting of the connection with the plurality of external devices in the second communication mode comprises:
       disconnecting the connection with the plurality of external devices in the second communication mode, in response to receiving an instruction to disconnect the connection in the second communication mode from the second device, and wherein, after successfully continuing to share the screen with the other external devices, the second device sends the instruction to the first device and the other external devices.

13. The method according to claim 1, wherein the first communication mode and the second communication mode are short-range wireless communication modes.

14. The method according to claim 1, wherein the first communication mode is a Wi-Fi direct communication, and the second communication mode is a Bluetooth communication.

15. A system for sharing a screen by a plurality of devices, the system comprising:
 a plurality of external devices; and
 a first device including:
  communication circuitry configured to operate in a first communication mode or a second communication mode, and
  at least one processor configured to:
   establish a connection with the plurality of external devices in the second communication mode,
   send, after establishing the connection, screen data to the plurality of external devices in real time in the second communication mode so as to share a screen,
   identify a remaining charge of the first device,
   perform a screen sharing function in a first mode in response to a determination that the remaining charge is less than a first threshold but greater than or equal to a second threshold, and
   perform the screen sharing function in a second mode in response to a determination that the remaining charge is less than the second threshold.

16. The system of claim 15, wherein the processor is further configured to, in the first mode:
 send, to a second device of the plurality of external devices, the screen data in the first communication mode so as to enable the second device to forward the screen data to a third device of the plurality of devices in real time; and
 disconnect a connection with the plurality of external devices in the second communication mode, in response to the second device successfully continuing to share the screen with the other external device.

17. The system of claim 15, wherein the processor is further configured to, in the second mode:
 send, to a second device of the plurality of external devices, the screen data in the first communication mode so as to enable the second device to replace the first device to continue to share the screen data with a third device of the plurality of external devices; and
 receive, from the second device, an instruction to disconnect the connection with the second device in the first communication mode such that the first device exits the screen sharing function.

\* \* \* \* \*